United States Patent [19]

Kashnitz et al.

[11] Patent Number: 5,518,699

[45] Date of Patent: May 21, 1996

[54] METHOD OF CARRYING OUT CHEMICAL REACTIONS IN REACTION DISTILLATION COLUMNS

[75] Inventors: John Kashnitz, Haltern; Frank Steding, Marl; Alfred Oberholz, Marl; Franz Nierlich, Marl; Bernd Nowitzki, Marl, all of Germany

[73] Assignee: Huels Aktiengesellschaft, Marl, Germany

[21] Appl. No.: 271,893

[22] Filed: Jul. 8, 1994

[30] Foreign Application Priority Data

Jul. 8, 1993 [DE] Germany .............. 43 22 712.0

[51] Int. Cl.⁶ ............................................ B01J 8/06
[52] U.S. Cl. .................. 422/211; 203/DIG. 6; 422/312
[58] Field of Search ............. 203/DIG. 6; 422/171, 422/177, 211, 187, 312; 202/158

[56] References Cited

U.S. PATENT DOCUMENTS

| | | | |
|---|---|---|---|
| 4,302,356 | 11/1981 | Smith Jr. ............... | 203/DIG. 6 |
| 4,359,591 | 11/1982 | Fremery et al. ............ | 568/804 |
| 4,443,559 | 4/1984 | Smith Jr. ............... | 203/DIG. 6 |
| 4,463,105 | 7/1984 | Ichikawa et al. ......... | 518/716 |
| 5,015,446 | 5/1991 | Trujillo ................ | 422/312 |
| 5,015,786 | 5/1991 | Araki et al. ............ | 568/798 |
| 5,136,106 | 8/1992 | King ................... | 568/618 |
| 5,176,883 | 1/1993 | Smith, Jr. et al. ....... | 203/DIG. 6 X |
| 5,231,230 | 7/1993 | Burgess et al. .......... | 564/480 |
| 5,304,688 | 4/1994 | Bowman et al. .......... | 568/727 |

FOREIGN PATENT DOCUMENTS

| | | |
|---|---|---|
| 0008860 | 3/1980 | European Pat. Off. . |
| 0302336 | 2/1989 | European Pat. Off. . |
| 0415310 | 3/1991 | European Pat. Off. . |
| 0189683 | 7/1991 | European Pat. Off. . |
| 2658569 | 8/1982 | Germany . |
| 3930515 | 3/1991 | Germany . |

*Primary Examiner*—Robert J. Warden
*Assistant Examiner*—Theresa T. Snider
*Attorney, Agent, or Firm*—Oblon, Spivak, McClelland, Maier & Neustadt

[57] ABSTRACT

Carrying out a chemical reaction in a reaction distillation column on an inorganic catalyst in the form of a column packing material which is maintained above the column bottom permits the use of high reaction temperatures and the easy removal or replacement of inactivated catalyst.

9 Claims, 1 Drawing Sheet

METHOD OF CARRYING OUT CHEMICAL REACTIONS IN REACTION DISTILLATION COLUMNS

BACKGROUND OF THE INVENTION

1. Field of the Invention

The present invention relates to a method of carrying out chemical reactions, other than alkylations of aromatic compounds, in a reaction distillation column on an acid catalyst. The present invention also relates to apparatus comprising reaction distillation columns suitable for use in the present method.

2. Discussion of the Background

Reactions on catalysts in distillation columns are known. In such reactions, a separation by distillation of the reaction products takes place immediately after the reaction occurs.

In DE-A-39 30 515, shaped bodies of macroporous ion exchangers are employed in order to carry out various reactions, in particular the synthesis of methyl tertbutyl ether, in columns. The ion exchanger shaped bodies can also be doped with metals of subgroups 7 and 8 of the Periodic Table of the Elements.

According to EP-A-0 415 310, tertiary alcohols are prepared from isoolefins and water on acid cation exchanger resins in distillation columns.

However, ion exchanger resins are temperature-sensitive. Thus, they can only be employed for brief periods at temperatures of 150° C. When using ion exchangers in long-term operation, on the other hand, temperatures of only up to about 110° C. are utilized, which for some reactions leads to a greatly increased and economically uninteresting reaction time.

According to EP-B-0 008 860, methyl tert-butyl ether can be prepared in reaction distillation columns on acid ion exchangers in cloth bags of a cloth belt. In addition to the facts that ion exchangers are temperature-sensitive and the cloth bags can break open, in this case, the entire installation must be shut down when exchanging inactivated catalyst. In this case also, only an entire cloth belt can ever be exchanged. Thus, it is not possible to exchange small catalyst regions rapidly, and production must be interrupted for at least several hours to replace inactivated catalyst.

In EP-A-0 302 336, a process for cleaving alkyl tert-alkyl ethers is described. The catalysts used are preferably acid cation exchangers but acidic $SiO_2$ or acidic $Al_2O_3$ can also be used. However, the catalyst is arranged at the foot of the column, that is, in the liquid region. The arrangement corresponds to a kettle with an attached column. Accordingly, the reaction only takes place in the liquid phase. The catalyst is therefore not a distillation packing material in the gas-liquid region, and the catalyst does not have a rectifying distillation effect.

In DE-C-26 58 569, the preparation of shaped catalysts, chiefly containing $TiO_2$, is described. $TiO_2$ is prepared from metatitanic acid gel, extruded and then calcined at 200° to 800° C. The catalysts can be used for removing nitrogen oxides from gases or for the catalytic oxidation of butene to acetic acid in the gas phase. Reactions in a gas-liquid system are not described.

According to EP-B-0 189 683, aromatic compounds are alkylated in a reaction distillation column on a fixed bed having an acid catalytic distillation structure. In this case, in particular, acid cation exchanger resins and also acid molecular sieves of the type $SiO_2/Al_2O_3$ are used as catalysts, preferably in bags. This patent does not disclose the use of any other catalysts, in particular oxides of higher molecular weight, or other chemical reactions.

According to DE-A-40 34 074, alkyl glycosides can be prepared in a reaction distillation column. In this case, the reaction is catalyzed homogeneously by liquid acids, and the catalyst is discharged with the reaction product. The alkylglycosides must therefore be neutralized by alkali after the reaction.

Thus, there remains a need for a method of carrying out a chemical reaction in a reaction distillation column which is free of the above-described drawbacks. In particular, there is a need for a method of carrying out a chemical reaction in a reaction distillation column which permits the use of catalysts which are stable at high temperatures and permits the easy replacement or removal of inactivated catalyst. There also remains a need for apparatus comprising a reaction distillation column which can be used in such a method.

SUMMARY OF THE INVENTION

Accordingly, it is one object of the present invention to provide a novel method for carrying out a chemical reaction, other than aromatic alkylation, in a reaction distillation column.

It is another object of the present invention to provide a method of carrying out a chemical reaction, other than aromatic alkylation, in a reaction distillation column which utilizes a catalyst which is stable at high temperatures.

It is another object of the present invention to provide a method of carrying out a chemical reaction, other than aromatic alkylation, in a reaction distillation column which permits the easy replacement or removal of the catalyst.

It is another object of the present invention to provide an apparatus comprising a reaction distillation column which can be used in such a method.

These and other objects, which will become apparent during the following detailed description, have been achieved by the inventors' discovery that reactions carried out on an inorganic catalyst in the form of a column packing material which is contained in a distillation reaction column above the column bottom may be conducted at high temperatures and permit the easy removal or replacement of catalyst.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
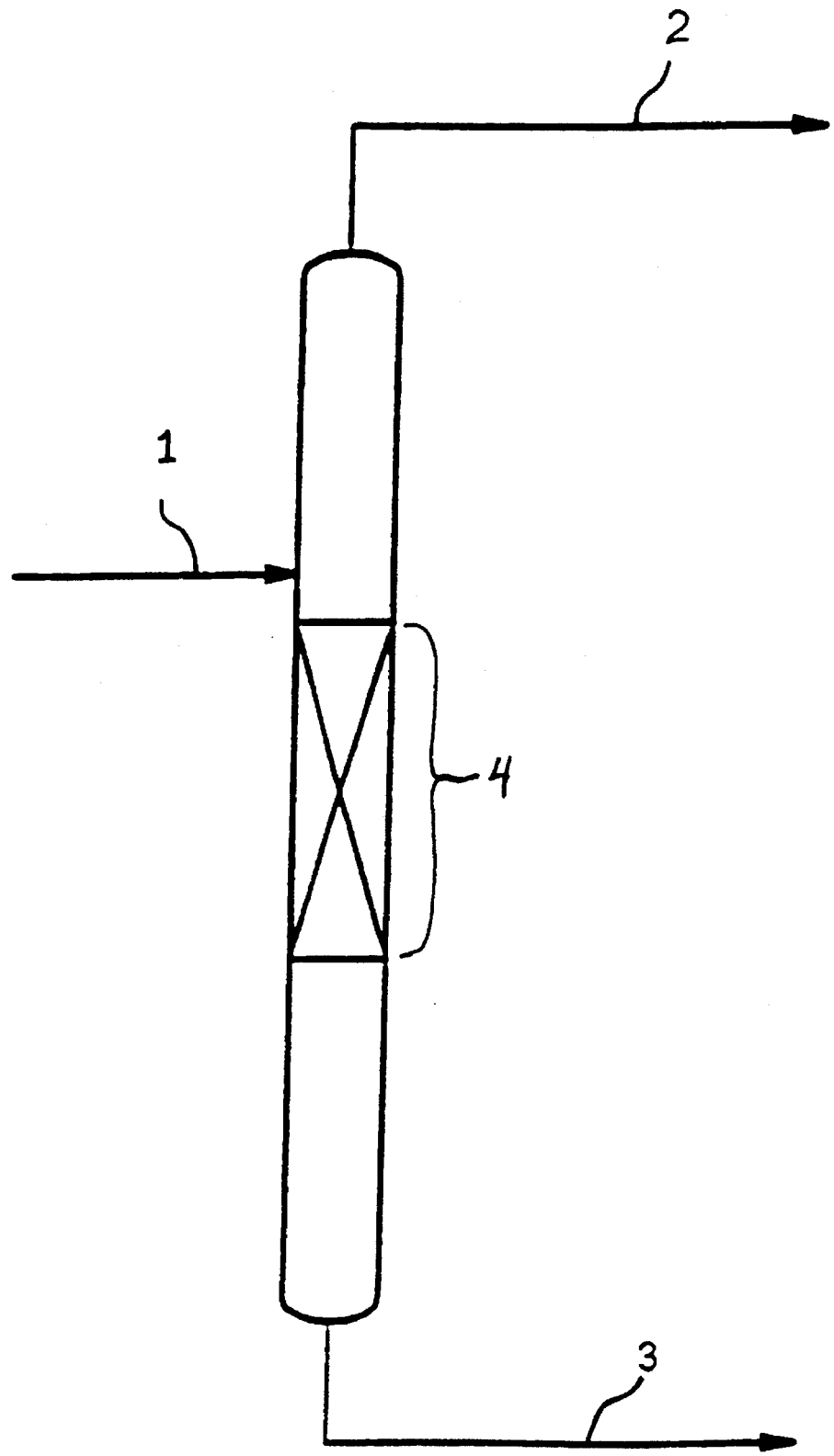
FIG. 1 shows a first embodiment of the present apparatus.

Thus, in a first embodiment, the present invention provides a method for carrying a chemical reaction, other than the alkylation of an aromatic compound, in a reaction distillation column in the presence of an acid catalyst, comprising conducting the reaction in a reaction distillation column in the presence of an inorganic catalyst wherein the inorganic catalyst is contained in a column packing material and is located above the bottom of the column.

The catalyst packing material generally comprises more than 60 wt. %, preferably more than 80 wt. %, based on the total weight of the packing material, of the catalytically active substance. The packing material may further comprise additional constituents such as activators, binders and other aids. Catalytically active substances which are useful are, inter alia, inorganic salts, acid salts, oxides, acid oxides and metals. Those which are suitable are, for example, oxides of magnesium, titanium, vanadium, chromium, manganese, iron, cobalt, nickel, copper, zinc, germanium, tin, bismuth, zirconium, niobium, molybdenum, rhodium, ruthenium, palladium, silver, tungsten, or platinum.

In an aqueous medium the catalysts have a pH of <7, preferably <3, as measured in Example 1 below.

Catalysts based on transition metal oxides are preferably used. Catalysts which contain $ZrO_2$, $TiO_2$ or mixtures of these oxides are highly particularly preferred.

In particularly preferred embodiments, catalysts containing $TiO_2$ and $ZrO_2$ have as further constituents clays, $SiO_2$, $Al_2O_3$, $B_2O_3$ or $H_3BO_3$, $P_2O_5$ or phosphates, sulfates, nitrates, fluorides, other transition metal oxides or transition metal salts, isopolyacids, for example those of tungsten, and heteropolyacids. When the catalyst contains a phosphate, sulfate, nitrate, or fluoride, the counter ion may be any cation which does not adversely affect the catalytic properties of the catalyst, such as $Na^+$, $K^+$, $NH_4^+$, etc.

$TiO_2$ can be used in the anatase, rutile or brookite form. Pyrolytically prepared $TiO_2$ can be used, for example. However, $TiO_2$ is preferably used in the anatase form, as obtained, e.g., in the sulfate process.

$ZrO_2$ is preferably obtained by a conventional precipitation or by specific hydrolysis from the solutions of zirconyl nitrate, zircon sulfate or zirconyl chloride and a thermal after treatment. Acid-treated high-surface area zirconium oxides or zirconium oxide precursor structures are also usable, in which case these are likewise thermally activated.

Suitable packing materials are, for example, honeycombs, pellets, tablets, rings, packing rings with bridges, tubes, cylinders and other rod extrudates. The catalysts are preferably used in the form of tubes and rings. The tubes and rings in this case generally have an internal diameter of 1 to 100 mm, preferably 2 to 75 mm, a wall thickness of 0.1 to 20 mm, preferably 0.5 to 10 mm, and a length of 5 to 100 mm, preferably 7 to 50 mm.

The packing materials can be obtained, for example, by extrusion and calcination, analogously to the process disclosed a DE-C-26 58 569, which is incorporated herein by reference. In the calcination of catalysts containing $TiO_2$, a temperature of 350° to 800° C. is generally employed, while in the case of catalysts containing $ZrO_2$, a temperature of 450° to 900° C. is preferred.

Additional components of the packing material, such as activators, binders, and other aids may be introduced during the production of the $TiO_2$ or $ZrO_2$, or alternatively in the production of the packing material. The substances can be introduced, for example, into the shaped compositions before the extrusion or by methods of impregnation.

The packings are arranged in the reaction distillation columns in the gas-liquid region above the column bottom.

They have a catalytic and distilling action in this case, since volatile components formed are immediately rectified thereon.

The column itself may be any conventional reaction distillation column. Suitably, the column is made of a material which is inert to the reactants under the reaction conditions, such as steel. The reaction distillation column may be equipped with heating means for maintaining the interior of the column at the temperature required for the reaction. The column may also be equipped with one or more inlet means for introducing the reactants and one or more outlet means for removing the products. The column will also comprise means for maintaining the catalyst-containing packing material above the bottom of the column in the gas-liquid region of the column. Suitable means for maintaining the catalyst-containing packing material above the bottom of the column include bubble-cap trays. Alternatively, the catalyst-containing packing material may be packed on top of a noncatalytic packing material which resides in the lower part of the column. Suitably the column has an inner diameter of 20 to 500 mm, preferably 50 to 200 mm, and a length of 0.5 to 10 m, preferably 1 to 5 m.

Suitably, the bottom most portion of the catalyst-containing packing material will be maintained at least 100 mm, preferably at least 1 mm, above the bottom of the column.

In the embodiment of the present apparatus shown in FIG. 1, the column comprises an inlet means (1) for introducing a liquid reactant, outlet means (2) and (3) for removing products. The catalyst-containing packing material (4) is maintained in the region above the bottom of the column.

The present method is suitable for gas-liquid chemical reactions of organic chemical compounds. At least one component, feed stock or reaction product must be fed or taken off in the liquid state in this case. The reaction takes place on the shaped bodies of the catalyst-containing packing material at temperatures of preferably 50° to 300° C. Reactions can also be carried out at temperatures above 300° C., but organic compounds have an increased tendency to undergo cracking and side-reactions, at such temperatures. A temperature range of 120° to 300° C. is particularly preferred, at which ion exchangers typically can no longer be used or can no longer be readily used.

The present method can, for example, be applied to chemical reactions, such as transesterification, acetal formation and hemiacetal formation, preparation of anhydrides and cyclizations with elimination of water or alcohol. However, syntheses of ethers, alcohols, and esters, cleavages of these products and olefin dimerizations are preferably carried out by the present method. Ethers are particularly preferably cleaved by the method according to the invention.

Ethers are generally synthesized at about 60° to 150° C. Examples of ether syntheses are the production of methyl tert-butyl ether (MTB) from methanol and isobutene and of tert-amyl methyl ether (TAME) from methanol and 2-methyl-2-butene. For the reverse reactions, the ether cleavages, temperatures of about 120° to 220° C. are preferably used.

Ester syntheses from alcohols and acids are usually carried out at temperatures of about 90° to 180° C. Examples of ester syntheses are the preparation of the methyl, ethyl and butyl esters of formic, acetic, propionic and butyric acids. The cleavage of esters on acid catalysts is conventionally carried out at 100° to 200° C.

For alcohol syntheses from olefins and water, temperatures in a broad range can be employed, depending on the reactivity and volatility of olefins and alcohols. Alcohol syntheses and cleavages are usually carried out at temperatures of 100° to 300° C. For the synthesis of octanol, the temperature is preferably 180° to 250° C. for the cleavage of t-butanol, usually 130° to 160° C.

For olefin dimerization, the temperature is typically 200° to 300° C. Suitable olefins which can be dimerized include ethene, propene, butene, isobutene, and pentene.

Because the reactions carried out according to the present method often involve the formation and/or reaction of a gaseous material, it is often convenient to run the reactions at superatmospheric pressure. Suitably, the pressure will be from atmospheric to 50 bar, preferably from atmosphere to 30 bar.

The method according to the present invention makes it possible to carry out chemical reactions at high temperatures. It is highly suitable for continuous production facilities. When the catalyst is exchanged, only brief interruptions in production are required. Thus, for example, the downtime of a plant is decreased from 3 days in the case of wire-mesh packages to 3 hours. In particular cases, the catalyst, by the vacuum cleaner principle, can even be taken off and supplemented without interruption of production.

In carrying out the chemical reactions in practice, starting compounds which are gaseous under the reaction conditions are generally added to the reaction distillation column beneath the catalyst layer and liquid components are added above the catalyst layer. In this case, the inlet means for introducing the gaseous starting material will be located below the means for maintaining the catalyst-containing packing material above the bottom of the column in the gas-liquid region of the column, and the inlet means for introducing the liquid starting material will be located above layer of catalyst-containing packing material.

Other features of the invention will become apparent in the course of the following descriptions of exemplary embodiments which are given for illustration of the invention and are not intended to be limiting thereof.

EXAMPLES

Example 1

A catalyst which contains 89.6 wt. % of $TiO_2$, 1.4 wt. % of sulfate and 9.0 wt. % of glass fibers and has a pH of 2.2 (3 g of catalyst are suspended in 10 g of water to determine the pH), is installed, in the form of tubes ($d_{inner}$=4 mm, $d_{outer}$=10 mm, l=10–25 mm), into a reaction distillation column having 20 bubble-cap trays and an internal diameter $d_{inner}$=80.9 mm, between the 5th and 6th tray from the top. The catalyst mass is in total 1,300 g.

For the subsequent ether cleavage, a pressure of 22.4 bar and a bottom temperature of 160° C. are set.

In the stationary phase, in accordance with FIG. 1, 5.4 mol/h of MTB are added via line 1, 0.6 mol/h of methanol and 5.4 mol/h of isobutene are taken off via line 2 and 4.6 mol/h of methanol and 0.2 mol/h of isobutene are discharged via line 3.

Example 2

The procedure described in Example 1 was followed. However, a pressure of 12.5 bar and a bottom temperature of 140° C. are set.

In a continuous process, 3.2 mol/h of MTB are added via line 1, 1.0 mol/h of methanol and 2.8 mol/h of isobutene are taken off via line 2 and 2.7 mol/h of methanol are discharged via line 3.

Example 3

The catalyst of Example 1 and a reaction distillation column in accordance with FIG. 1 having an internal diameter $d_{inner}$=80 mm and a length l=3 m are used. The catalyst mass is in total 3,100 g.

The following esterification of acetic acid with n-butanol is carried out at atmospheric pressure and at a bottom temperature of 130° C. Both the aqueous and organic phase are refluxed at the head of the column.

In steady-state operation, 1.0 mol/h of acetic acid and 1.21 mol/h of n-butanol are added via line 1. 0.76 mol/h of butyl acetate, 0.77 mol/h of water and 0.45 mol/h of n-butanol are taken off via line 2. 0.24 mol/h of unreacted acetic acid are taken off via line 3.

Example 4

The reaction distillation column used here has an internal diameter $d_{inner}$=80 mm, and it comprises 2 parts each of 2 m in length. The upper part is packed with the catalyst of Example 1 in the form of cylindrical rings ($d_{inner}$=8 mm, $d_{outer}$=12 mm, l=12 mm). The lower part is equipped with a catalyst-free arranged packing.

For the dimerization of butene, an operating pressure of 12 bar and a bottom temperature of 242° C. are set.

In steady-state operation, 2.55 kg/h of 1-butene, 2.05 kg/h of butane, 0.82 kg/h of isooctene and 0.11 kg/h of isododecene are added, the feed being beneath the catalyst packing. 1.44 kg/h of 1-butene and 2.02 kg/h of butane are taken off via the distillate stream. 0.004 kg/h of 1-butene, 0.03 kg/h of butane, 1.85 kg/h of isooctene and approximately 0.186 kg/h of isododecene are produced in the column bottom.

At a reflux ratio of approximately 10, the conversion rate of 1-butene is about 43%.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of carrying out a chemical reaction which comprises the steps of:

(a) providing a reaction distillation column which has a bottom portion and a top portion and a column packing material comprising an inorganic acid catalyst positioned therebetween, wherein said column packing material is maintained above said bottom portion of said column;

and wherein said column packing material is in the form of tubes or rings, and wherein an inlet means for introducing starting material is located below said catalyst for a gaseous starting material or above said catalyst for a liquid starting material, and wherein an outlet means for collecting a reaction product is located above said catalyst for a product which is gaseous under reaction conditions or below said catalyst for a product which is liquid under reaction conditions;

(b) introducing a starting material into said inlet means;

(c) conducting a reaction, other than an alkylation of an aromatic compound, in said reaction distillation column in the presence of an inorganic acid catalyst in said reaction distillation column; and (d) removing a reaction product of said reaction from said outlet means.

2. The method of claim 1, wherein said catalyst comprises a transition metal oxide.

3. The method of claim 2, wherein said catalyst comprises zirconium dioxide, titanium dioxide, or a mixture thereof.

4. The method of claim 1, wherein said reaction is carried out at a temperature of from 50° to 300° C.

5. The method of claim 1, wherein said reaction is the synthesis of an ether, an ester, or an alcohol.

6. The method of claim 1, wherein said reaction is the cleavage of an ether, an ester, or an alcohol.

7. The method of claim 6, wherein said reaction is an ether cleavage.

8. The method of claim 1, wherein said reaction is olefin dimerization.

9. The method of claim 1, wherein said catalyst comprises zirconium dioxide, titanium dioxide, or a mixture thereof.

* * * * *